(12) United States Patent
Huang

(10) Patent No.: US 10,251,477 B1
(45) Date of Patent: Apr. 9, 2019

(54) RACK FOR ELECTRONIC DEVICES

(71) Applicant: Cheng Yu Huang, New Taipei (TW)

(72) Inventor: Cheng Yu Huang, New Taipei (TW)

(*) Notice: Subject to any disclaimer, the term of this patent is extended or adjusted under 35 U.S.C. 154(b) by 0 days.

(21) Appl. No.: 15/950,342

(22) Filed: Apr. 11, 2018

(51) Int. Cl.
*A47B 23/00* (2006.01)
*A47B 21/03* (2006.01)
*G06F 1/16* (2006.01)
*A47B 23/04* (2006.01)
*A47B 21/04* (2006.01)

(52) U.S. Cl.
CPC ........ *A47B 23/001* (2013.01); *A47B 21/0314* (2013.01); *A47B 21/04* (2013.01); *A47B 23/04* (2013.01); *G06F 1/1632* (2013.01)

(58) Field of Classification Search
CPC . G06F 1/1632; A47B 23/04; A47B 2023/049; A47B 21/0314; A47B 23/001; A47B 21/04; A47B 2023/005; A47B 23/06
See application file for complete search history.

(56) References Cited

U.S. PATENT DOCUMENTS

| 5,205,631 | A | * | 4/1993 | Wegman | A47B 21/0314 |
| | | | | | 312/208.1 |
| 8,424,464 | B2 | * | 4/2013 | Korpi | A47B 23/044 |
| | | | | | 108/27 |
| 2003/0079661 | A1 | * | 5/2003 | Luu | A47B 3/08 |
| | | | | | 108/116 |
| 2010/0133208 | A1 | * | 6/2010 | Seo | A47B 23/04 |
| | | | | | 211/26 |

* cited by examiner

*Primary Examiner* — James Wu
(74) *Attorney, Agent, or Firm* — Jackson IPG PLLC; Demian K. Jackson

(57) ABSTRACT

A detachable, multifunctional rack for electronic devices includes a rectangular platform (1) including a lower board (10) secured to an underside, two sets of a plurality of hollow members (11) on two sides of the lower board (10) respectively, and a space (15) under the lower board (10); two L-shaped supports (2) mounted to two sides of the platform (1) respectively, each support (2) including a horizontal member (21) releasably secured to either side of the platform (1), a vertical member (22) releasably secured to the horizontal member (21), and a plurality of aligned, spaced tubular members (23) on one side of the horizontal member (21); and two pins (14) each passing through one set of the hollow members (11) and the tubular members (23) at either side of the platform (1) to fasten the platform (1) and the supports (2) together.

3 Claims, 7 Drawing Sheets

RACK FOR ELECTRONIC DEVICES

BACKGROUND OF THE INVENTION

1. Field of the Invention

The invention relates to racks and more particularly to a detachable, multifunction rack for electronic devices.

2. Description of Related Art

Computer, communication, and consumer electronics (3C) are popular throughout the world and they are characterized by short popular life. Many people own at least one of a personal computer (PC), a notebook computer, a tablet computer, and a mobile phone such as smart phone. Modern smart phones have many functions similar to a PC and thus are multifunctional.

As for PCs, they are typically used in home or office due to stable power, quality screen, large keyboard, mouse, high capacity memory, etc. Typically a PC comprises a monitor, a keyboard, and a mouse.

As for mobile phones, tablet computers and notebook computers, they are light weight and portable. Thus, frequent charging is inevitable for their use. Further, how to support them and properly connect them is a big issue to be addressed. It is necessary to take holding above electronic devices in place into consideration when using them in an indoor environment. Sufficient space for accommodating them is also an issue to be addressed especially when the space is limited.

SUMMARY OF THE INVENTION

It is therefore one object of the invention to provide a rack for electronic devices comprising a rectangular platform including a lower board secured to an underside, two sets of a plurality of hollow members on two sides of the lower board respectively, and a space under the lower board; two L-shaped supports mounted to two sides of the platform respectively, each support including a horizontal member releasably secured to either side of the platform, a vertical member releasably secured to the horizontal member, and a plurality of aligned, spaced tubular members on one side of the horizontal member; and two pins each passing through one set of the hollow members and the tubular members at either side of the platform to fasten the platform and the supports together.

The above and other objects, features and advantages of the invention will become apparent from the following detailed description taken with the accompanying drawings.

DETAILED DESCRIPTION OF THE INVENTION

Figure 1:
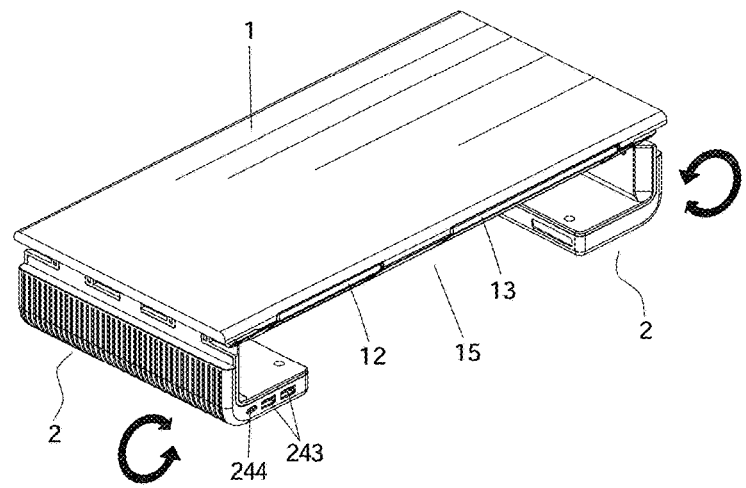
FIG. 1 is a perspective view of a rack according to the invention.
Figure 2:
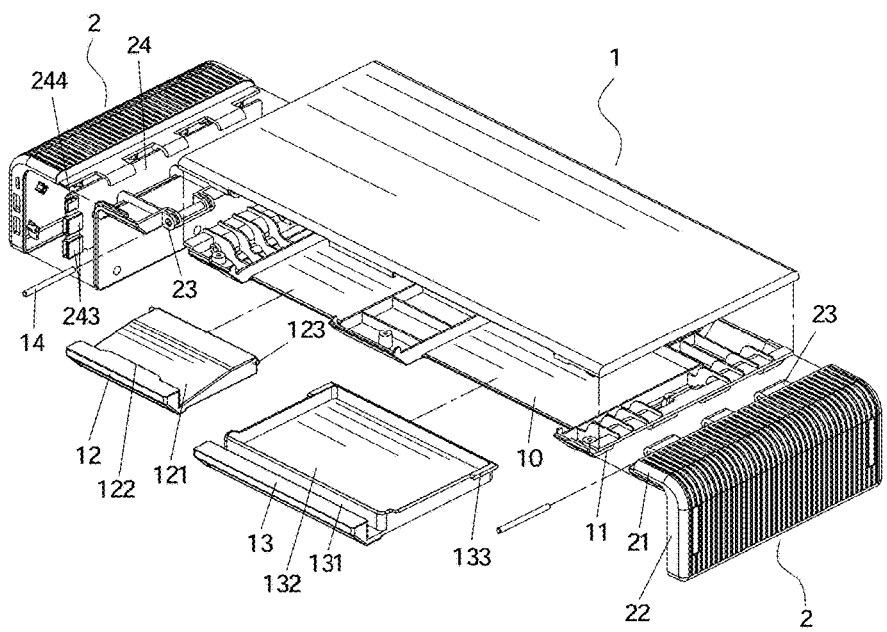
FIG. 2 is an exploded view of the rack.
Figure 3:
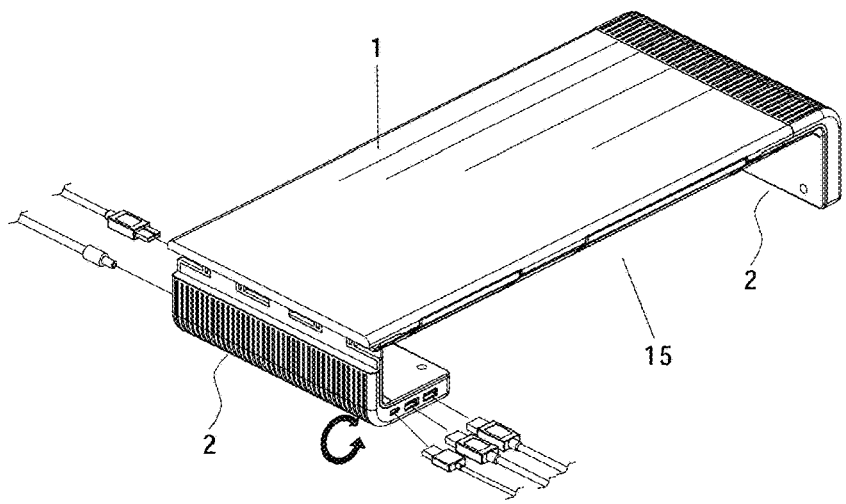
FIG. 3 is another perspective view of the rack after assembling same.
Figure 4:
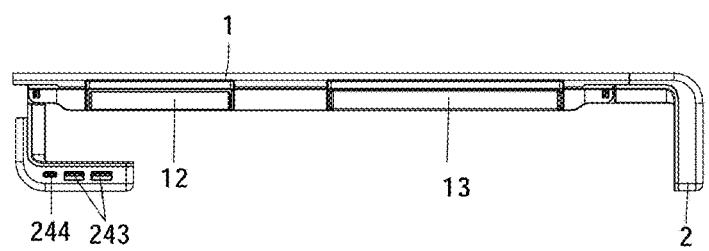
FIG. 4 is a front view of the rack of FIG. 3.
Figure 5:
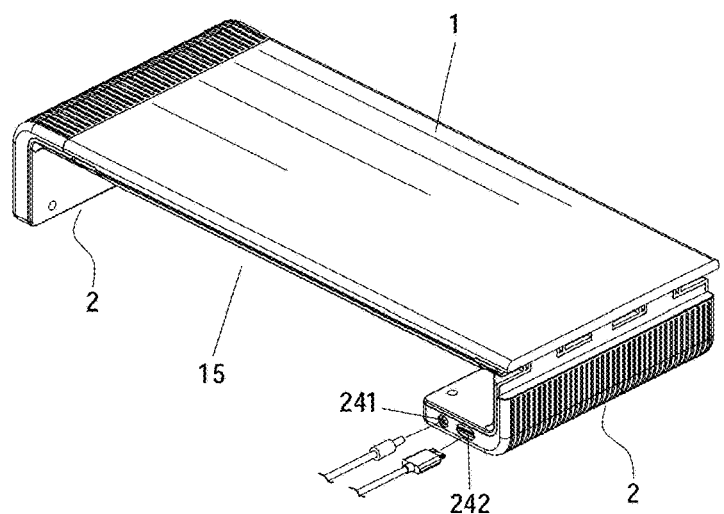
FIG. 5 is another perspective view of the rack of FIG. 3 viewing from the rear end.
Figure 6:
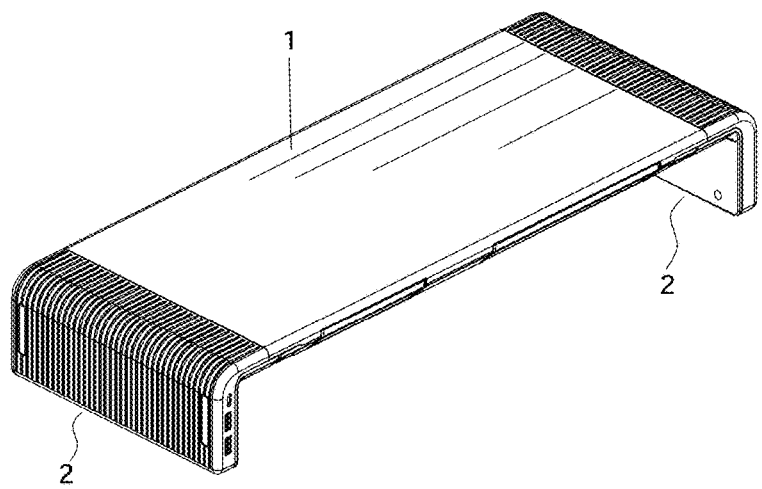
FIG. 6 is still another perspective view of the rack.
Figure 7:
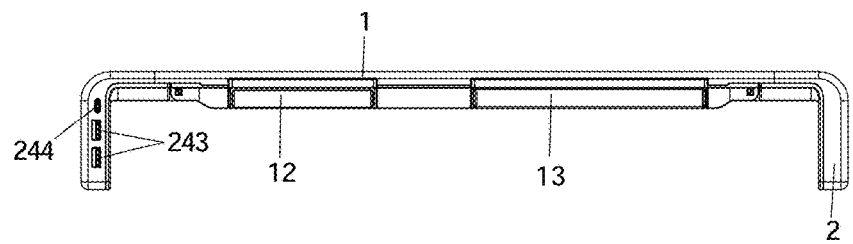
FIG. 7 is a front view of FIG. 6.

Referring to FIGS. 1 to 7, a rack in accordance with the invention comprises a rectangular platform 1 and two L-shaped supports 2 mounted to two sides of the platform 1 respectively as discussed in detail below.

The platform 1 comprises a lower board 10 secured to an underside; two sets of a plurality of hollow members 11 on two sides of the lower board 10 respectively; a left, rectangular holding member 12 including an inclined top surface 121, an elongated projection 122 on a front end of the top surface 121, and two pivots 123 on two sides of a rear end respectively and slidably secured to the lower board 10; a right, rectangular tray 13 spaced from the holding member 12 and including a front groove 131, a concave surface 132, and two slides 133 on two sides of a rear end respectively and slidably secured to the lower board 10; and a space 15 under the lower board 10.

The support 2 comprises a horizontal member 21 releasably secured to either side of the platform 1, a vertical member 22 releasably secured to the horizontal member 21, and a plurality of aligned, spaced tubular members 23 on one side of the horizontal member 21. Two pins 14 each pass through one set of the hollow members 11 and the tubular members 23 at either side of the platform 1 to fasten the platform 1 and the supports 2 together.

The support 2 further comprises a printed circuit board (PCB) 24 disposed in one of the vertical members 22. The PCB 24 includes a power socket 241, a first Universal Serial Bus (USB) port 242, a second USB port 243, and a USB TYPE-C port 244.

Figure 8:
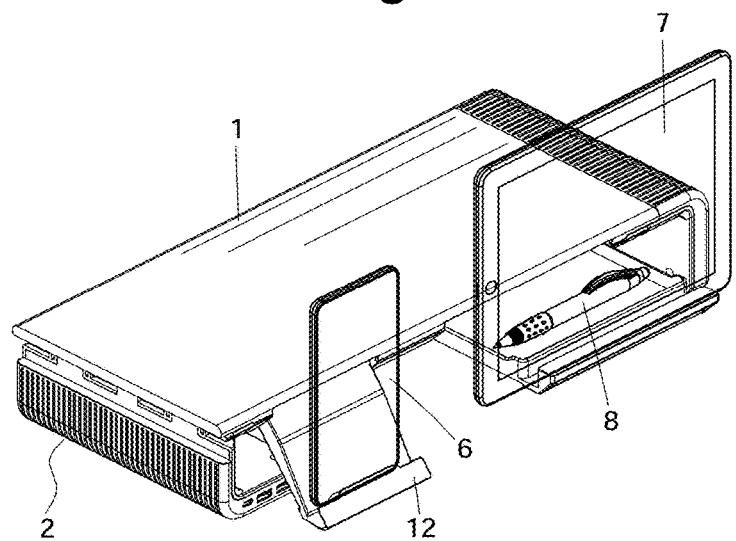
FIG. 8 is a perspective view showing a first embodiment of using the rack to support electronic devices.

Referring to FIG. 8 in conjunction with FIGS. 1-7, a mobile phone 6 can be placed on the inclined top surface 121 after pulling out the holding member 12, a tablet computer 7 has its bottom fastened in the groove 131 after pulling out the tray 13, and a pen 8 is placed on the concave surface 132.

Figure 9:
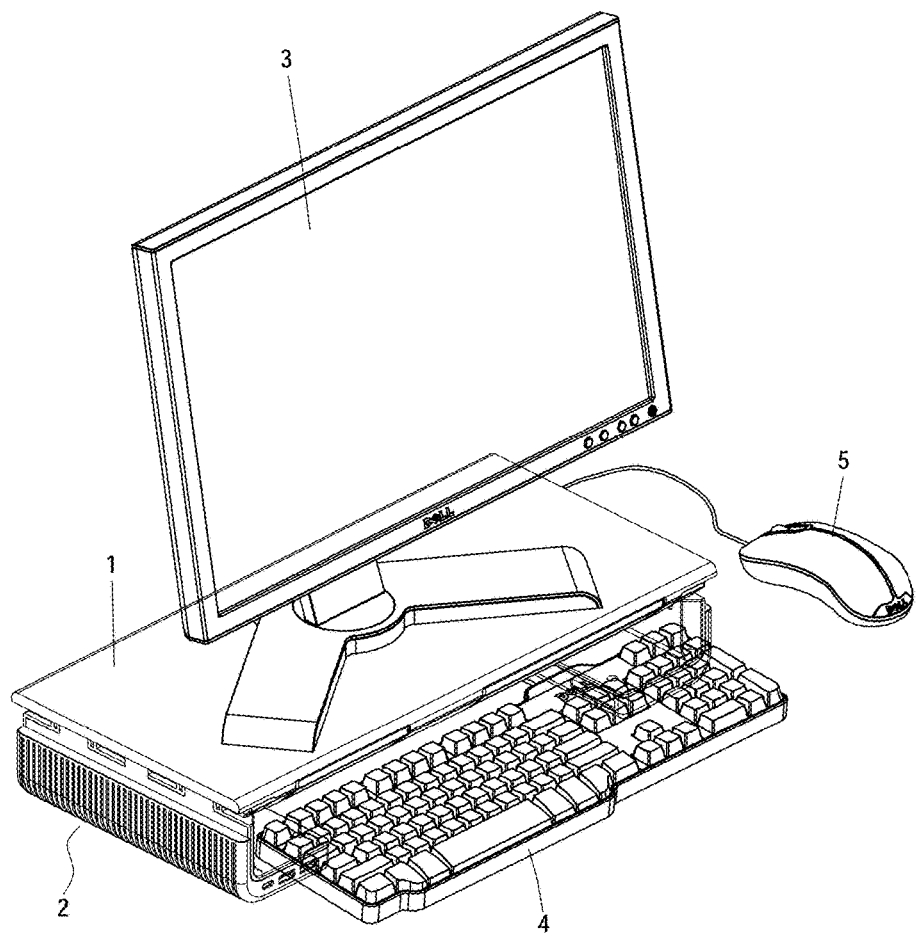
FIG. 9 is a perspective view showing a second embodiment of using the rack to support electronic devices.

Referring to FIG. 9 in conjunction with FIGS. 1-7, a liquid-crystal display (LCD) monitor 3 is placed on the platform 1, a keyboard 4 is partially disposed in the space 15, a mini personal computer (not shown) is disposed in the space 15, and a mouse 5 is exposed.

Figure 10:
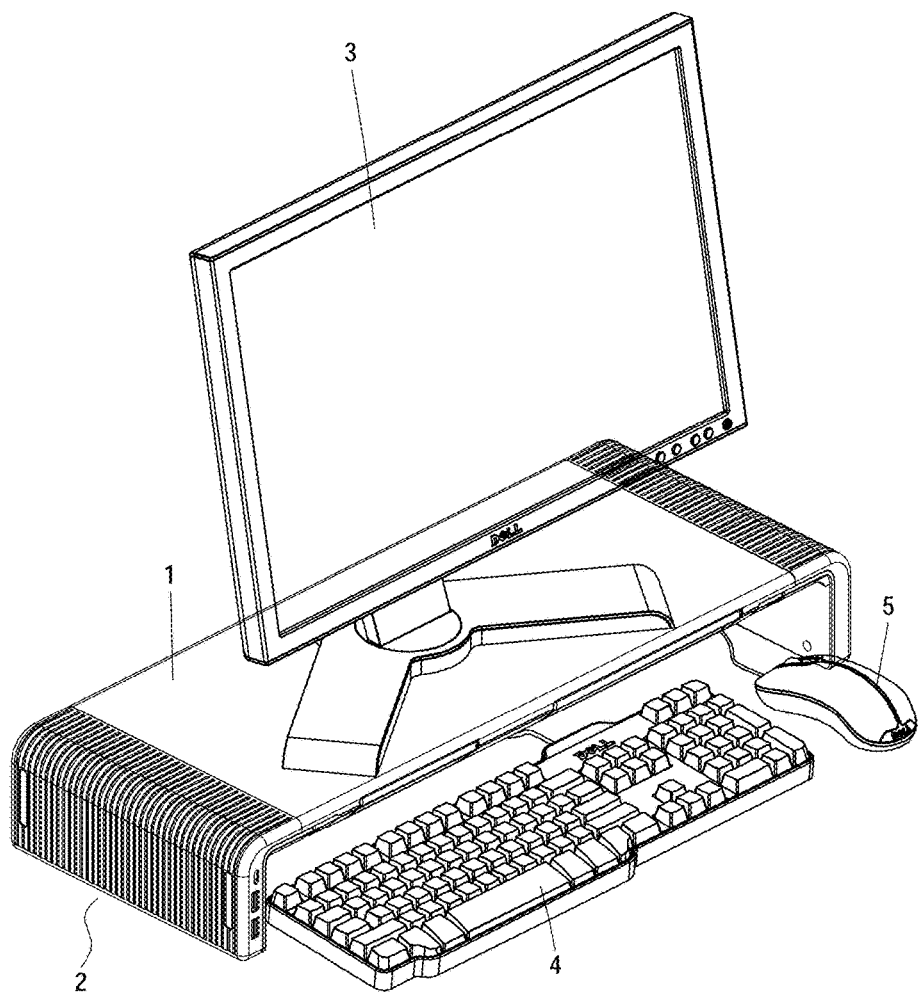
FIG. 10 is a perspective view showing a third embodiment of using the rack to support electronic devices.

Referring to FIG. 10 in conjunction with FIGS. 1-7, an LCD monitor 3 is placed on the platform 1, a keyboard 4 is almost completely disposed out of the space 15, a mini personal computer (not shown) is disposed in the space 15, and a mouse 5 is placed on the right side of the keyboard 4.

Figure 11:
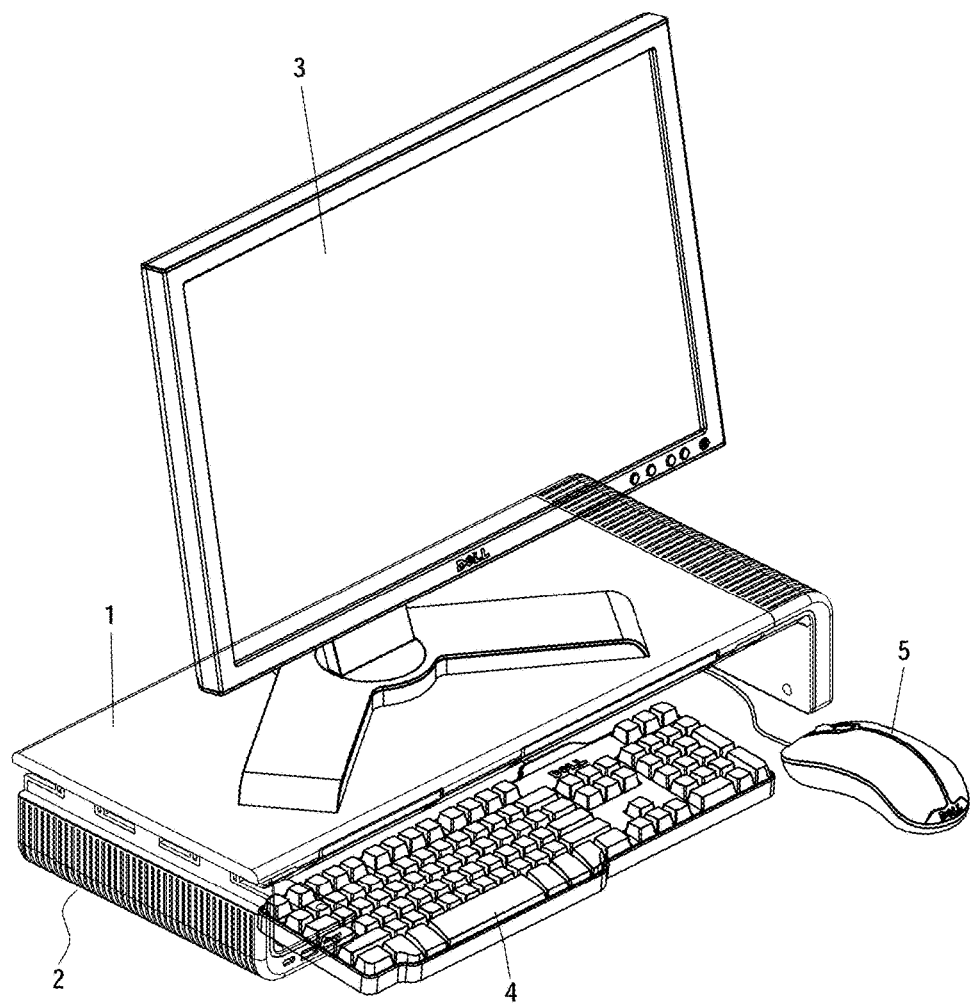
FIG. 11 is a perspective view showing a fourth embodiment of using the rack to support electronic devices.

Referring to FIG. 11 in conjunction with FIGS. 1-7, an LCD monitor 3 is placed on the platform 1, a keyboard 4 is partially disposed in the space 15, a mini personal computer (not shown) is disposed in the space 15, and a mouse 5 is placed on the right side of the keyboard 4.

Figure 12:
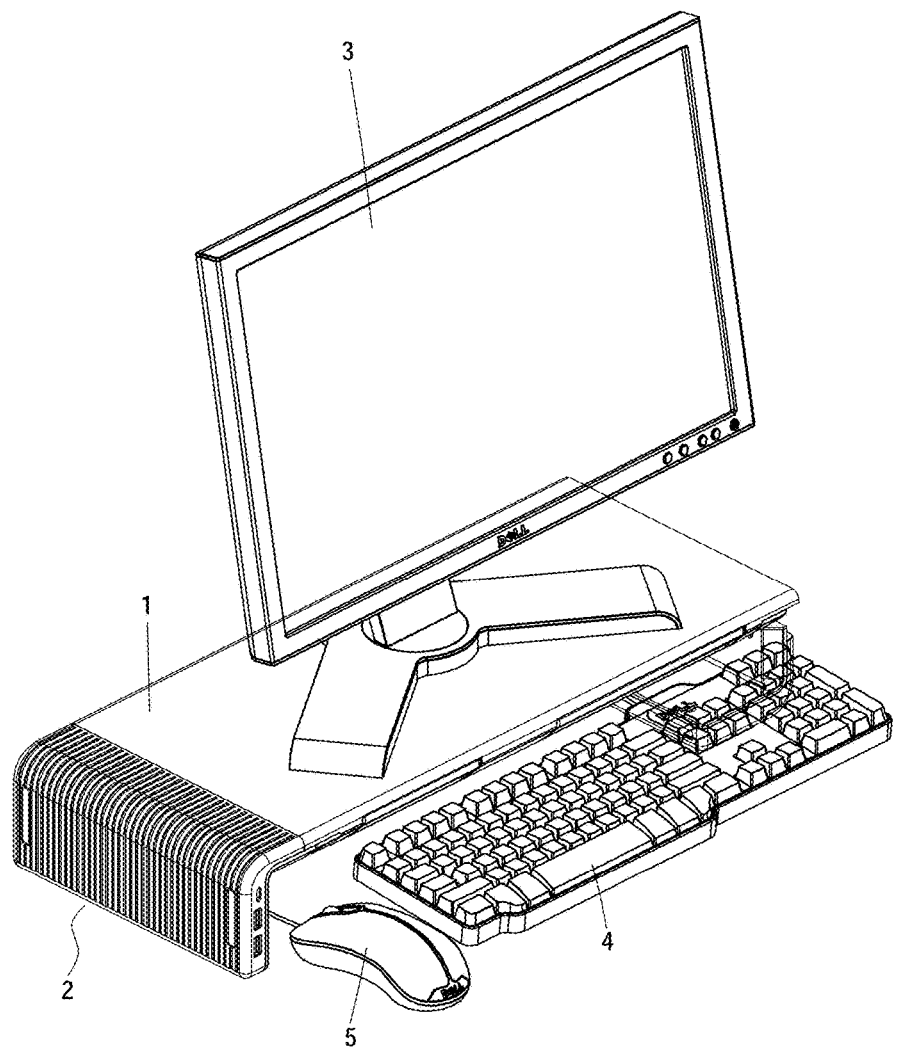
FIG. 12 is a perspective view showing a fifth embodiment of using the rack to support electronic devices.

Referring to FIG. 12 in conjunction with FIGS. 1-7, an LCD monitor 3 is placed on the platform 1, a keyboard 4 is partially disposed in the space 15, a mini personal computer (not shown) is disposed in the space 15, and a mouse 5 is placed on the left side of the keyboard 4.

While the invention has been described in terms of preferred embodiments, those skilled in the art will recognize that the invention can be practiced with modifications within the spirit and scope of the appended claims.

What is claimed is:

1. A rack for electronic devices comprising:
a rectangular platform including a lower board secured to an underside, two sets of a plurality of hollow members on two sides of the lower board respectively, and a space under the lower board;
two L-shaped supports mounted to two opposite sides of the platform respectively, each support including a first member rotatably secured at a first edge thereof to either opposite side of the platform, a second member secured to an opposite second edge of the first member, and a plurality of aligned, spaced tubular members on the first edge of the first member; and
two pins each passing through one set of the hollow members and the tubular members at either opposed side of the platform to fasten the platform and the L-shaped supports together,
wherein the L-shaped supports are movable between an extended position and a folded position and wherein the rack is configured to rest on a support surface upon the L-shaped supports with the rectangular platform at a same distance above the support surface with the L-shaped supports in either of the extended or folded positions.

2. The rack of claim 1, further comprising a rectangular holding member including an inclined top surface, an elongated projection on a front end of the top surface, and two pivots on two sides of a rear end respectively and slidably secured to the lower board; and a rectangular tray including a front groove, a concave surface, and two slides on two sides of a rear end respectively and slidably secured to the lower board.

3. The rack of claim 1, wherein one of the L-shaped supports further comprises a printed circuit board (PCB) disposed in the second member thereof, the PCB including a power socket a first Universal Serial Bus (USB) port a second USB port, and a USB TYPE-C port.

* * * * *